Feb. 26, 1957

L. M. EWING 2,783,295

WAVEGUIDE SEAL

Filed Jan. 18, 1952

Inventor:
Lewis M. Ewing,
by Merlon D Morse
His Attorney.

United States Patent Office 2,783,295
Patented Feb. 26, 1957

2,783,295

WAVEGUIDE SEAL

Lewis M. Ewing, Syracuse, N. Y., assignor to General Electric Company, a corporation of New York Application January 18, 1952, Serial No. 267,088

6 Claims. (Cl. 174—35)

My invention relates to waveguide joints, and more particularly to waveguide joints of the abutting-flange type for sealing a waveguide hermetically and against loss of radio-frequency wave energy.

An object of my invention is to provide an improved fluid-tight radio-shielded joint for waveguides or the like.

Another object is to provide such a waveguide joint which is simple in construction and economical to produce, and which at the same time performs the desired sealing functions reliably to prevent loss of fluid or radio energy therethrough.

Figure 1:
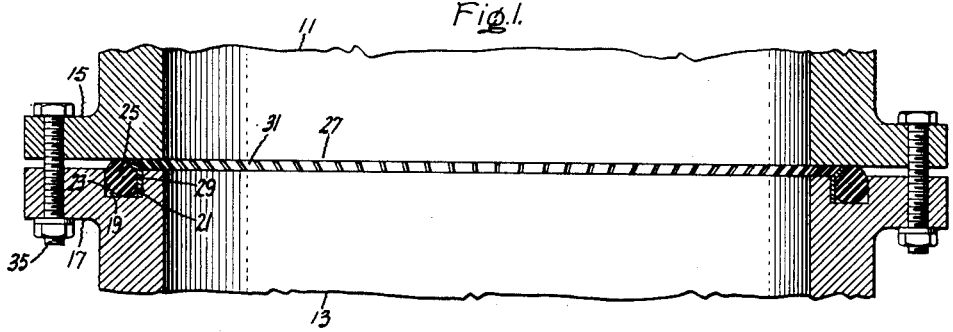
Figure 2:
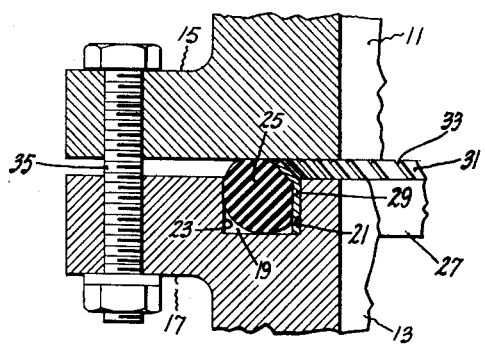
Figure 3:
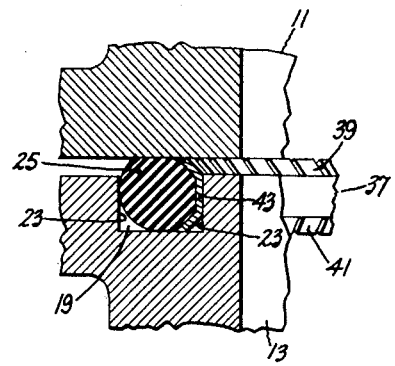
Figure 4:
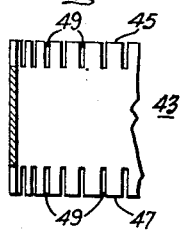
Figure 5:
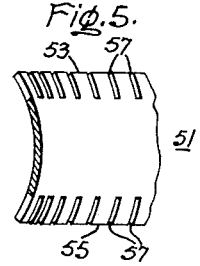

Other objects will become apparent and the invention better understood from a consideration of the following description taken in conjunction with the accompanying drawing in which:

Fig. 1 is a longitudinal cross-sectional view through a pair of circular waveguides provided with a joint according to a preferred form of my invention; Fig. 2 is an enlarged view of part of the joint structure of Fig. 1; Fig. 3 is a fragmentary view of a modification of the washer member shown in Figs. 1 and 2; and Figs. 4 and 5 are fragmentary views of still further modifications of the washer member of my novel joint.

In waveguide transmission systems, it is sometimes desirable to pressurize the interior of the guides, and therefore, at the joints of adjacent sections of the system, hermetic sealing is required to prevent loss of the pressurizing fluid. Also, it is desirable to provide good electrical continuity between adjacent sections of waveguide to prevent leakage of radio-frequency wave energy therethrough. To that end, conductive washers are employed to ensure electrical continuity between the joined sections of waveguides.

In the improved joint of my invention, illustrated in Figs. 1 and 2, two waveguides 11, 13 are joined by a fluid-tight, electrically-conducting joint which comprises a resilient member and a deformable conductive washer. The waveguides are provided with radially extending flanges 15, 17 at the adjacent ends thereof, one of said flanges 17, having an annular groove 19 formed therein, which groove is preferably of a radius such that the inner and outer edges 21, 23 of the groove lie within the wall thickness of the guide.

A resilient member 25 extends completely around the periphery of the groove 19 and is of a cross-sectional dimension somewhat greater than the depth of the groove so that, in the untightened condition of the guide, the member 25 projects beyond the top of the groove 19.

A deformable electrically-conductive gasket 27, is preformed with a cylindrical body part 29 which is adapted to be disposed between the resilient member 25 and the inner edge 21 of the groove 19. An outwardly flared or frusto-conical part 31 of the washer is peripherally slotted, as at 33, and normally overlies the contiguous projecting part of the resilient member 25, whereby, upon securing the flanges 15, 17 tightly together, as by bolts 35, the slotted flared part 31 of the washer 27 is deformably pressed between the relatively smooth abutting surface of the flange 15 and the resilient member 25, deforming the latter to provide a hermetic seal, while the washer provides a wide-area electrical contacting surface between the joined waveguides.

It will be understood that, for applications in which the fluid within the guide is known to have a low moisture content, the frusto-conical flared part 31 is subject to little or no corrosive attack and accordingly may be positioned as shown in Figs. 1 and 2. However, if the fluid is known to have a relatively high corrosion-activity-producing component, the flared part 31 can be inwardly formed instead of outwardly, as shown in Figs. 1 and 2, and the washer, so formed, may then be positioned between the outer edge 23 of groove 19 and the resilient member 25, thereby to isolate the washer from such corrosion-producing components.

Fig. 3 illustrates a modified form of washer 37 which can be employed in my waveguide joint. As shown, the washer is preformed with outwardly-flared or frusto-conical slotted parts 39, 41 respectively above and below a cylindrical part 43. In assembly and operation, the washer 37 is inserted into the groove 19 between the resilient member 25 and the inner edge 21 of the groove. The lower flared part 41 is thus positioned to lie between the floor of the groove and the underside of the resilient member 25, whereby, upon securing the waveguides 11 and 13, the respective flared parts 39 and 41 are deformed into substantially horizontal positions to provide good electrical contact between the joined waveguides, the member 25 being deformed hermetically to seal the joint.

Further modified forms of deformable electrically conductive washers are illustrated in Figs. 4 and 5. In the embodiment of Fig. 4, a washer 43 is preformed as a substantially cylindrical member having upper and lower sides 45, 47, respectively, that are weakened along predetermined upper and lower lines, as by a plurality of slots 49. In the embodiment of Fig. 5, a gasket 51, is preformed as a peripherally-channelled annular member of which the upper and lower edges 53, 55 are slotted as at 57 to define respective upper and lower weakened lines.

The washers 43 and 51 (Figs. 4 and 5), are inserted in a manner similar to that described hereinabove in connection with the assembly of washers 27 and 43. Thus, the washers are disposed between the resilient member 25 and the inner edge of the groove 19. Upon securing the waveguides 11 and 13 together, the washers are deformed along the respective upper and lower weakened lines so that the upper slotted part is bent over the projecting part of the resilient member and the lower slotted part is bent under the resilient member, thus forming, in effect, a U-shaped channel ring intimately contacting the contiguous conductive surfaces of the joined waveguides. The resilient member is deformed, as above-described, to provide hermetic sealing.

It will be apparent that, although my waveguide seal has here been described in connection with waveguides of circular cross section, the seal can be used, as effectively, with waveguides of other cross section, as for example, rectangular or elliptical.

Instead of the above-described annular gasket forms, the washers can be formed in strip form so that desired lengths can be cut to fit a predetermined dimension of waveguide flange groove of any desired cross-section.

While I have shown and described specific embodiments of my invention, I do not desire my invention to be limited to the particular form shown and described and I intend by the appended claims to cover all modifications within the spirit and scope of my invention.

What I claim as new and desire to secure through Letters Patent of the United States is:

1. In combination, a pair of waveguides each having radially extending flanges adapted to be secured together, one said flange having an annular groove therein, a resilient member extending completely throughout said groove and having a normal diameter greater than the depth of said groove, a deformable electrically conductive member conforming generally to said groove and having a first part adapted to be disposed within said groove intermediate said resilient member and a wall of said groove, and a second part slotted parallel to the axis of said groove and adapted for deformation in partly overlapping relation with said resilient member upon securing of said flanges together, and a means for securing said flanges together.

2. The combination as defined in claim 1, wherein said first part of said conductive member is cylindrical and said slotted part normally projects beyond said groove.

3. The combination as in claim 1, wherein said first part of said conductive member is cylindrical, and said second part comprises a pair of outwardly flared slotted edge portions.

4. The combination as in claim 1, wherein said first part is formed with a peripheral groove, and said second part comprises a pair of edge portions having slots parallel to each other and to the axis of said groove.

5. An arrangement for sealing two abutting surfaces, one of which has an annular groove lying within the periphery of its surface, comprising a resilient member extending completely throughout said groove and having a normal diameter greater than the depth of said groove, a deformable electrically conductive member conforming generally to said groove and having a first part adapted to be disposed within said groove intermediate said resilient member and a wall of said groove, and a second part being outwardly flared away from the axis of said groove and slotted for deformation in partly overlapping relation with said resilient member upon the securing of said surfaces together.

6. An arrangement for sealing two abutting surfaces, one of which has a groove lying within the periphery of its surface, comprising a resilient member extending throughout said groove and having a normal dimension greater than the depth of said groove, a deformable electrically conductive member conforming generally to said groove and having a first part adapted to be disposed within said groove intermediate said resilient member and a wall of said groove, and a second part being outwardly flared away from said wall of said groove and slotted for deformation in partly over-lapping relation with said resilient member upon the securing of said surfaces together.

References Cited in the file of this patent

UNITED STATES PATENTS

| | | |
|---|---|---|
| 1,648,347 | Hosking | Nov. 8, 1927 |
| 1,755,743 | Morrison | Apr. 22, 1930 |
| 1,943,739 | Nowosielski | Jan. 16, 1934 |
| 2,087,920 | Mascuch | July 27, 1937 |
| 2,133,789 | Pool | Oct. 18, 1938 |
| 2,407,076 | Harkness | Sept. 3, 1946 |
| 2,469,474 | Perry | May 10, 1949 |